United States Patent
Kang et al.

(10) Patent No.: US 9,094,060 B2
(45) Date of Patent: Jul. 28, 2015

(54) APPARATUS FOR TRANSMITTING AND RECEIVING SIGNAL IN DISTRIBUTED ANTENNA SYSTEM

(75) Inventors: Ji Won Kang, Anyang-si (KR); Bin Chul Ihm, Anyang-si (KR); Jin Young Chun, Anyang-si (KR)

(73) Assignee: LG ELECTRONICS, INC., Seoul (KR)

( * ) Notice: Subject to any disclaimer, the term of this patent is extended or adjusted under 35 U.S.C. 154(b) by 328 days.

(21) Appl. No.: 13/581,792

(22) PCT Filed: Mar. 4, 2011

(86) PCT No.: PCT/KR2011/001494
§ 371 (c)(1),
(2), (4) Date: Aug. 29, 2012

(87) PCT Pub. No.: WO2011/108880
PCT Pub. Date: Sep. 9, 2011

(65) Prior Publication Data
US 2012/0322477 A1 Dec. 20, 2012

Related U.S. Application Data

(60) Provisional application No. 61/310,286, filed on Mar. 4, 2010.

(30) Foreign Application Priority Data

May 20, 2010 (KR) .................. 10-2010-0047328

(51) Int. Cl.
*H04B 7/00* (2006.01)
*H04B 7/02* (2006.01)
*H04B 7/06* (2006.01)

(52) U.S. Cl.
CPC ............. *H04B 7/022* (2013.01); *H04B 7/0626* (2013.01); *H04B 7/0691* (2013.01)

(58) Field of Classification Search
CPC ..... H04B 7/022; H04B 7/0626; H04B 7/0691
USPC ........... 455/509, 450, 501; 370/329, 338, 341
See application file for complete search history.

(56) References Cited

U.S. PATENT DOCUMENTS

| 8,208,434 | B2* | 6/2012 | Sayana et al. ............... 370/329 |
| 2006/0013151 | A1 | 1/2006 | Lee et al. |
| 2010/0323684 | A1* | 12/2010 | Cai et al. ................... 455/422.1 |
| 2011/0032888 | A1* | 2/2011 | Matsumoto et al. ......... 370/329 |

(Continued)

FOREIGN PATENT DOCUMENTS

| KR | 10-2009-0088083 A | 8/2009 |
| WO | WO 2009/120791 A2 | 10/2009 |

(Continued)

*Primary Examiner* — Dominic E Rego
(74) *Attorney, Agent, or Firm* — Birch, Stewart, Kolasch & Birch, LLP

(57) ABSTRACT

The present invention relates to a method for receiving a signal through a terminal in a distributed antenna system (DAS) comprising the steps of: receiving composition information of a local midamble corresponding to a terminal or a terminal group including the terminal from a base station which belongs to the DAS; and receiving the local midamble from the base station, and the local midamble can be a midamble corresponding to one or more effective transmission antennas associated with the terminal or the terminal group of a plurality of antennas of the base station.

20 Claims, 8 Drawing Sheets

(56) References Cited

U.S. PATENT DOCUMENTS

| | | | |
|---|---|---|---|
| 2011/0034175 A1* | 2/2011 | Fong et al. | 455/450 |
| 2011/0038302 A1* | 2/2011 | Papasakellariou et al. | 370/315 |
| 2011/0070891 A1 | 3/2011 | Nishio et al. | |
| 2011/0173496 A1* | 7/2011 | Hosek et al. | 714/26 |
| 2011/0317641 A1* | 12/2011 | Noh et al. | 370/329 |
| 2012/0021753 A1* | 1/2012 | Damnjanovic et al. | 455/450 |
| 2012/0113852 A1* | 5/2012 | Xu et al. | 370/252 |
| 2013/0010964 A1* | 1/2013 | Fong et al. | 380/277 |
| 2014/0378139 A1 | 12/2014 | Kishiyama et al. | |

FOREIGN PATENT DOCUMENTS

| | | |
|---|---|---|
| WO | WO 2009/157167 A1 | 12/2009 |
| WO | WO 2010/011056 A2 | 1/2010 |
| WO | WO 2010/018742 A1 | 2/2010 |

* cited by examiner

APPARATUS FOR TRANSMITTING AND RECEIVING SIGNAL IN DISTRIBUTED ANTENNA SYSTEM

CROSS REFERENCE TO RELATED APPLICATIONS

This non-provisional application is a 371 of International Application No. PCT/KR2011/001494 filed on Mar. 4, 2011, which claims the benefit of U.S. Provisional Application No. 61/310,286 filed on Mar. 4, 2010, and claims benefit to Korean Application No. 10-2010-0047328 filed in the Republic of Korea, on May 20, 2010. The entire content of all of the above applications is hereby incorporated by reference.

TECHNICAL FIELD

The present invention relates to a wireless communication system, and more particularly to, an apparatus for transmitting and receiving a signal in a distributed antenna system (DAS).

BACKGROUND ART

With the development of the information industry, the technology that can transmit various kinds of large data at high speed has been required. In this respect, a DAS that provides a plurality of distributed antennas within an existing cell has been studied to remove a shade zone and extend coverage.

The distributed antenna system (DAS) uses a plurality of distributed antennas connected with a single base station through a cable or a dedicated line, wherein the single base station manages a plurality of antennas located within a cell at at least predetermined interval. The DAS provided with a plurality of antennas located within a cell at at least predetermined interval is different from a centralized antenna system (CAS) provided with a plurality of antennas centralized at the center of a cell. Generally, the CAS uses various multi-antenna systems such as an open loop-multi input multi output (OL-MIMO) system, a close loop-single user-multi input multi output (CL-SU-MIMO) system, a close loop-multi user-multi input multi output (CL-MU-MIMO) system, and a multi-base station-multi input multi output (multi-BS-MIMO) system in such a manner that multiple antennas are installed in one base station in a cell based structure of a cellular communication system such as a wideband code division multiple access (WCDMA) system, a high speed packet access (HSPA) system, a long term evolution (LTE)/long term evolution-advanced (LTE-A) system, and a 802.16 system.

The DAS is different from a femto cell in that each unit of the distributed antennas does not manage an area of a corresponding antenna, but areas of all distributed antennas located within a cell are managed by a base station at the center of the cell. Also, the DAS is different from a multi-hop relay system or ad-hoc network, of which a base station is connected with a relay station (RS) through a wireless mode, in that distributed antenna units are connected with one another through a cable or a dedicated line. Moreover, the DAS is different from a repeater, which simply amplifies and transmits a signal, in that each of distributed antennas can transmit different signals to different user equipments located near the antennas in accordance with a command of a base station.

This DAS may be regarded as a multiple input multiple output (MIMO) system in that distributed antennas can support a single user equipment or multiple user equipments by transmitting and receiving different data streams at the same time. In view of the MIMO system, the DAS is advantageous in that it can reduce a transmission power as a transmission zone of each antenna is reduced than that of the CAS due to antennas distributed at various locations within a cell. Also, the DAS can reduce path loss by reducing a transmission distance between an antenna and the user equipment, thereby enabling high rate transmission of data. As a result, the DAS can enhance transmission capacity and power efficiency of the cellular system, and can satisfy communication throughput of quality more relatively uniform than that of the CAS regardless of user location within the cell. Also, since the base station is connected with a plurality of distributed antennas through a cable or a dedicated line in the DAS, signal loss is reduced, and correlation and interference between the antennas are reduced, whereby a high signal to interference to noise ratio (SINR) can be obtained.

As described above, in order to reduce facility costs of the base station and maintenance costs of a backhaul network in a next generation mobile communication system and at the same time extend service coverage and improve channel capacity and SINR, the DAS can be a new basis of cellular communication by being compatible with the existing CAS or replacing with the CAS.

DISCLOSURE

Technical Problem

If a DAS is used in the CAS based communication standard such as a 3GPP LTE/LTE-A and IEEE 802.16 system represented by IMT-2000 or IMT-advanced system, it is difficult to manage a DAS through a cell-specific reference signal (CRS), a channel state information reference signal (CSI-RS) and midamble, which are used in the existing communication stand.

For example, if 24 downlink transmitting antennas are distributed in one cell of a system that supports a DAS, a user equipment cannot identify a channel for each of the 24 antennas through maximum available 4Tx or 8Tx CRSs, CSI-RSs and midambles in accordance with the current communication standard, whereby channel estimation cannot be performed.

Also, in case of a user equipment that supports the existing CAS only, a problem occurs in that the user equipment fails to discriminate the CAS from the DAS.

Accordingly, an object of the present invention devised to solve the aforementioned problems is to provide a method for limiting the number of pilot patterns by grouping a plurality of antennas into a predetermined number of antenna groups in a DAS.

Another object of the present invention is to provide a method for configuring a suitable midamble to allow a user equipment to efficiently measure a channel state in a DAS support system or a system that uses both a CAS and a DAS.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To solve the aforementioned technical problems, according to one aspect of the present invention, a method for receiving, by a user equipment, a signal in a distributed antenna system (DAS) comprises: receiving configuration information of a local midamble corresponding to a user equipment or a user equipment group including the user equipment from a base station which belongs to the DAS; and receiving the local midamble from the base station, wherein the local midamble corresponds to one or more effective transmitting antennas associated with the user equipment or the user equipment group, among a plurality of antennas of the base station.

The method according to one aspect of the present invention may further comprise: performing channel estimation by discerning the local midamble corresponding to the one or more effective transmitting antennas on the basis of the configuration information on the local midamble.

The method according to one aspect of the present invention may further comprise: transmitting feedback information based on channel estimation for the one or more effective transmitting antennas to the base station.

The method according to one aspect of the present invention may further comprise: receiving configuration information of a global midamble corresponding to each of the plurality of antennas included in the base station from the base station; and receiving the global midamble from the base station.

At this time, the method according to one aspect of the present invention may further comprise: performing channel estimation for each of the plurality of antennas of the base station by using the global midamble. Moreover, the method may further comprise: generating information on one or more effective transmitting antennas associated with the user equipment or the user equipment group on the basis of result of the channel estimation; and transmitting the information on the one or more effective transmitting antennas to the base station.

To solve the aforementioned technical problems, according to another aspect of the present invention, a method for receiving, by a user equipment, a signal through in a distributed antenna system (DAS) comprises: receiving group mapping information for mapping a plurality of antennas of a base station, which belongs to the DAS, into one or more local antenna groups of the base station from the base station; and receiving a midamble corresponding to each of the antennas included in the local antenna group.

At this time, the respective local antenna groups have the same global midamble for the antennas (n-th antennas) having the same index.

To solve the aforementioned technical problems, according to still another aspect of the present invention, a method for transmitting, by a base station, a signal in a distributed antenna system (DAS) comprises: configuring a local midamble corresponding to one or more effective transmitting antennas associated per user equipment or per user equipment group; and transmitting the local midamble corresponding to each user equipment or each user equipment group.

The method according to still another embodiment of the present invention may further comprise: configuring and broadcasting a global midamble corresponding to each of a plurality of antennas of the base station.

The method according to still another embodiment of the present invention may further comprise: receiving feedback information including information on the one or more effective transmitting antennas generated by result of channel estimation on the basis of the global midamble from the user equipment or the user equipment group.

The method according to still another embodiment of the present invention may further comprise: selecting the one or more effective transmitting antennas associated with the user equipment or the user equipment group based on the feedback information. Also, the method may further comprise: transmitting configuration information of the local midamble corresponding to each user equipment or each user equipment group.

The method according to still another embodiment of the present invention may further comprise: receiving feedback information based on result of channel estimation performed for each of the one or more effective transmitting antennas on the basis of the local midamble from the user equipment or the user equipment group.

To solve the aforementioned technical problems, according to further still another aspect of the present invention, a method for transmitting a signal through a base station in a distributed antenna system (DAS) comprises: allocating a plurality of antennas to one or more local antenna groups; and broadcasting a global midamble corresponding to each of the antennas included in the local antenna groups, wherein global midambles for the antennas (n-th antennas) having the same index on the basis of the respective local antenna groups are the same as one another.

The method according to further still another embodiment of the present invention may further comprise: transmitting group mapping information related to mapping of the plurality of antennas into the one or more local antenna groups.

To solve the aforementioned technical problems, according to further still another aspect of the present invention, a user equipment in a distributed antenna system (DAS) comprises a reception module for receiving a signal; and a processor performing channel estimation on the basis of a local midamble corresponding to the user equipment or the user equipment group including the user equipment, which is received from a base station belonging to the DAS through the reception module, wherein the local midamble corresponds to one or more effective transmitting antennas associated per user equipment or per user equipment group, among a plurality of antennas of the base station.

To solve the aforementioned technical problems, according to further still another aspect of the present invention, a base station in a distributed antenna system (DAS) comprises a transmission module for transmitting a signal; and a processor configuring a local midamble corresponding to one or more effective transmitting antennas associated per user equipment or per user equipment group, which belongs to the DAS, wherein the global midamble is broadcasted in a service support region of the base station through the transmission module and the local midamble is transmitted to the user equipment or the user equipment group, which belongs to the DAS.

In the aforementioned aspects of the present invention, the antennas or antenna groups may be used as antenna ports in the LTE/LTE-A.

The aforementioned technical solutions are only a part of the preferred embodiments of the present invention, and various modifications to which technical features of the present invention are applied could be understood by the person with ordinary skill in the art to which the present invention pertains, based on the following detailed description of the present invention.

Advantageous Effects

According to the embodiments of the present invention as described above, a pilot used in a system that supports a DAS is configured to be identified from a pilot used in an existing system, so that a DAS user equipment may perform channel estimation.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters. For example, although the following description will be made based on TREE 802.16 system, the IEEE 802.16 system is only exemplary and the following description may be applied to various wireless communication systems including a 3rd generation partnership project (3GPP) system.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

Moreover, in the following description, it is assumed that a user equipment (UE) will refer to a mobile or fixed type user terminal device such as a mobile station (MS). Also, it is assumed that a base station will refer to a random node of a network terminal that performs communication with a user equipment, such as Node B (NB), eNode B (eNB), and processing server (PS).

Figure 1:
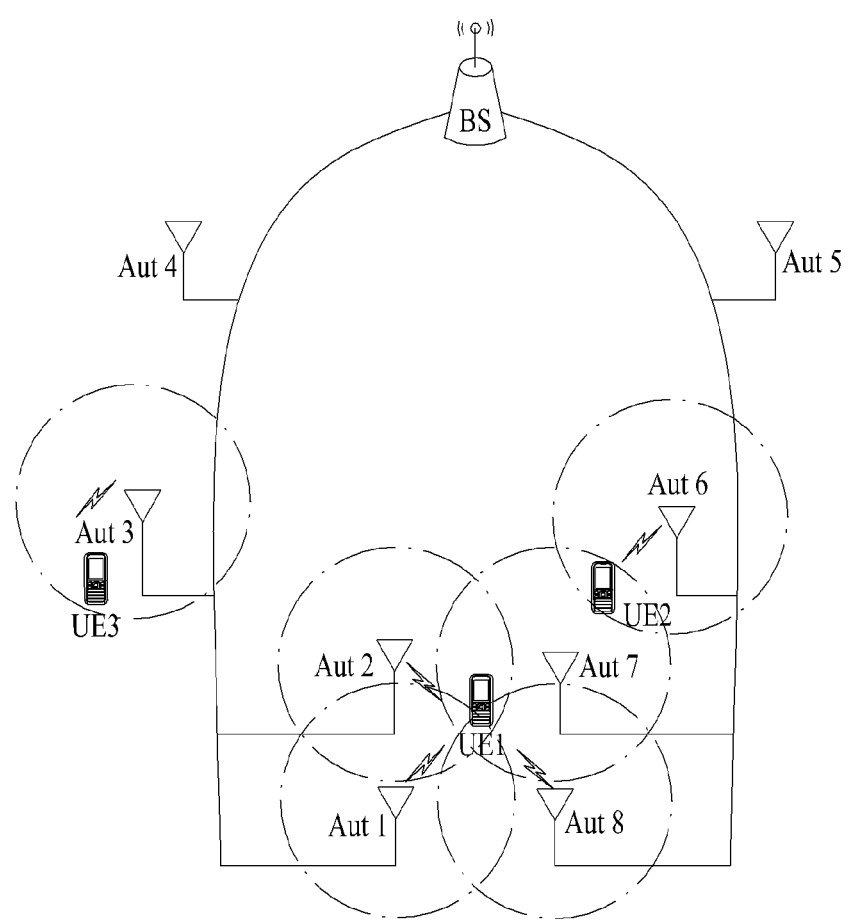
FIG. 1 is a diagram illustrating an example of a DAS structure to which the present invention is applied.

FIG. 1 is a diagram illustrating an example of a DAS structure to which the present invention is applied.

The base station illustrated in FIG. 1 includes a plurality of antennas located at the center of a cell in accordance with a CAS. For conciseness of description, FIG. 1 illustrates DAS antennas only. In a DAS, a plurality of antennas connected with a single base station, which is located within a cell, through a cable are distributed at various locations within the cell. This DAS may be configured in various manners depending on the number and location of antennas. For example, a plurality of antennas may be distributed within the cell at constant intervals or two or more antennas may be centralized at a specific place. If a coverage area of each of the distributed antennas are overlapped with that of another distributed antenna, signal transmission of rank 2 or more may be performed in the DAS regardless of the location of the distributed antennas within the cell. Rank means the number of data streams that can be transmitted at the same time through one or more antennas.

Referring to FIG. 1, one base station that supports one cell zone is connected with a total of eight antennas through a cable, wherein the respective antennas may be located at constant intervals or various intervals within the cell. In the DAS, all the antennas connected with the base station are not needed to be used, and a proper number of antennas may be used based on their signal transmission range, an overlap level of coverage and interference with their neighboring antenna, and the distance with the user equipment.

For example, if three user equipments (UE 1 to UE 3) are located within the cell and UE 1 is located within a signal transmission range of the antennas 1, 2, 7 and 8 as illustrated in FIG. 1, the UE 1 may receive a signal from one or more of the base station antennas 1, 2, 7 and 8. On the other hand, in view of the UE 1, it is likely that path loss may occur in the antennas 3, 4, 5 and 6 and power consumption may be increased therein due to a long distance between the corresponding antennas and the user equipment UE 1, and the signals transmitted from the antennas 3, 4, 5 and 6 may be small values that may be disregarded.

For another example, since the UE 2 is located in a portion where the signal transmission range of the antenna 6 is overlapped with that of the antenna 7, the signals transmitted through the other antennas except for the antennas 6 and 7 may be small or weak that may be disregarded. Also, since the UE 3 is located within a neighboring distance of the antenna 3, it may exclusively receive the signal transmitted through the antenna 3.

As illustrated in FIG. 1, if a plurality of antennas are spaced apart from one another within the cell of the DAS, the DAS is operated like a MIMO system. The base station may perform communication with the UE 1 through an antenna group 1 configured by one or more of the antennas 1, 2, 7 and 8, communication with the UE 2 through an antenna group 2 configured by one or more of the antennas 6 and 7, and communication with the UE 3 through the antenna 3. At this time, the antennas 4 and 5 may perform transmission for the UE 3 and the UE 2, respectively, or may be operated in an idle state.

In other words, the DAS may include various data streams for transmission per user equipment during communication with a single user/multiple users. Also, various antennas or antenna groups may be allocated to user equipments located within the cell supported by the base station in the DAS. A specific antenna or antenna group, which performs communication with a user equipment, may be defined depending on the location of the corresponding user equipment located within the cell. Alternatively, the antenna or antenna group, which performs communication with a user equipment, may adaptively be changed depending on movement of the user equipment within the cell.

Figure 2:
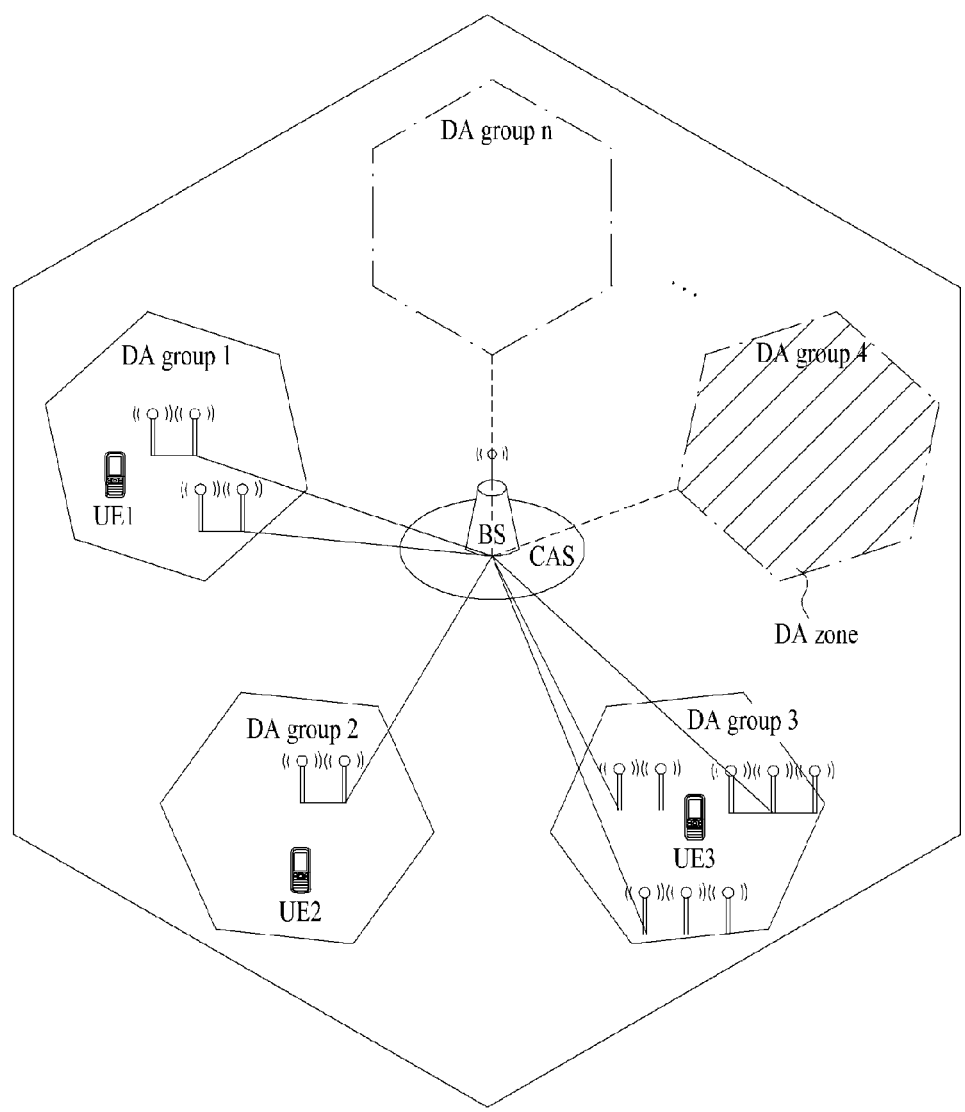
FIG. 2 is a diagram illustrating another example of a DAS structure to which the present invention is applied.

FIG. 2 is a diagram illustrating another example of a DAS structure to which the present invention is applied. In more detail, FIG. 2 illustrates an example of a system structure when a DAS is applied to a centralized antenna system that uses cell based multiple antennas according to the related art.

Referring to FIG. 2, a plurality of centralized antennas (CAs) having a similar effect in path loss due to an antenna interval much shorter than a cell radius may be located at the center of a cell zone adjacent to the base station, wherein the cell zone is supported by the base station. Also, a plurality of distributed antennas (DAs) having different effects in path loss due to an antenna interval longer than the antenna interval of the CAs may be located at predetermined intervals within the cell zone.

The DAs are configured by one or more antennas connected from the base station through one cable, and may be used to refer to antenna node for DAS or antenna node. In other words, the antenna node includes one or more antennas, and the antennas constituting each antenna node are connected with one another through a cable. The one or more DAs form one DA group, thereby forming a DA zone.

The DA group, which includes one or more DAs, may variably be configured depending on the location or receiving status of the user equipment, or may fixedly be configured by the number of maximum antennas used in MIMO. According to the IEEE 802.16m, the number of maximum antennas is 8Tx. The DA zone is defined by the range that the antennas constituting the DA group can transmit or receive a signal. The cell zone illustrated in FIG. 2 includes n number of DA zones. The user equipment that belongs to the DA zone may perform communication with one or more of the DAs constituting the DA zone, and the base station may increase a transmission rate by using the DAs and the CAs at the same time during signal transmission to the user equipment belonging to the DA zone.

A CAS that includes a DAS is illustrated in FIG. 2, whereby the base station and the user equipment may use the DAS in the CAS structure that uses multiple antennas according to the related art. Although the CAs and the DAs are located separately in FIG. 2 for conciseness of description, they may be located in various manners depending on their embodiments without limitation to the example of FIG. 2.

As described above, in the DAS, various number of data streams per user equipment during SU/MU MIMO communication may exist, a specific antenna or antenna group may be allocated to each user equipment, wherein the specific antenna or antenna group allocated to the corresponding user equipment may be changed in real-time.

In this specification, transmitting antennas of the DAS may be the one or more distributed antennas or one or more antenna groups or may be used together with the one or more DAs or DA groups.

Also, if the LTE/LTE-A system supports the DAS, the antennas/antenna groups or DAs/DA groups described with reference to FIG. 1 and FIG. 2 may refer to one or more antenna ports. Hereinafter, antenna or pilot pattern in the embodiments of the present invention may be replaced with antenna port.

The present invention relates to a method for selecting an effective transmitting antenna per user equipment or per user equipment group in a base station, which includes a plurality of antennas in view of DAS features. In more detail, a DAS system according to the present invention may be managed respectively by a case where a service is provided to a user equipment only which supports a DAS and a case where a service is provided to a user equipment which supports at least one of a CAS and a DAS.

1. First Embodiment

Service Support for DAS Support User Equipment

If a DAS according to one embodiment of the present invention provides a service to a user equipment only which supports a DAS, the user equipment may not need to differentiate a CAS from the DAS.

Accordingly, a DAS base station according to one embodiment of the present invention may equally use a pilot pattern per antenna used in the existing CAS based communication standard. For example, the base station may equally use pilot patterns such as CRS, CSI-RS and midamble in the current LTE/LTE-A and TREE 802.16 systems, which support maximum 4Tx or 8Tx.

However, since the number of antennas of the base station may be more than 9 in view of DAS features, if a pilot pattern per antenna is configured separately, resources allocated to a pilot signal are increased and pilot overhead is also increased.

Figure 3:
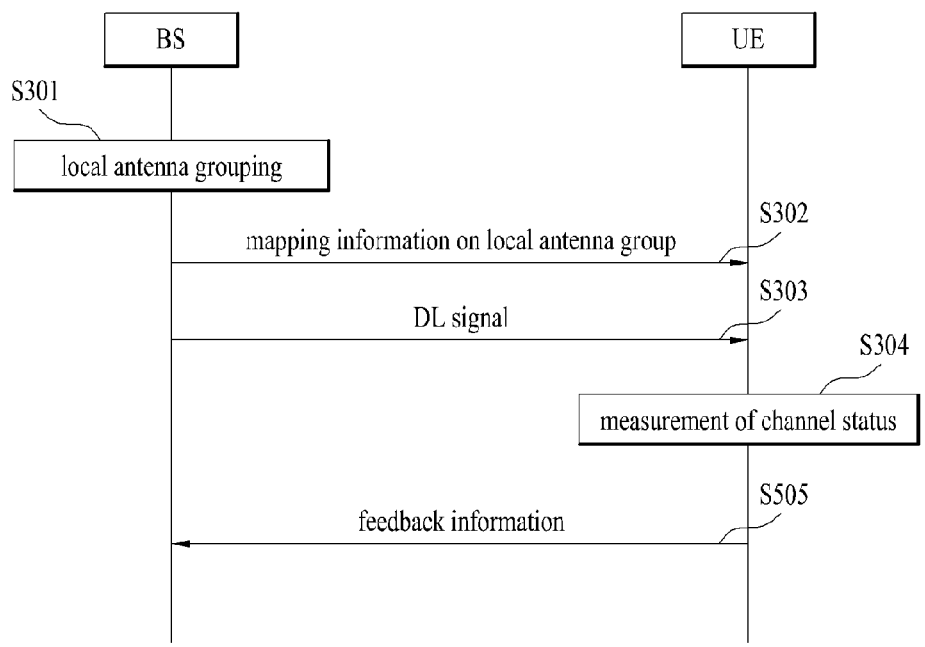
FIG. 3 is a diagram illustrating an example of a procedure of signal transmission between a base station and a user equipment in a DAS according to one embodiment of the present invention.

FIG. 3 is a diagram illustrating an example of a procedure of signal transmission between a base station and a user equipment in a DAS according to one embodiment of the present invention. The user equipment shown in FIG. 3 may be a user equipment or a user equipment group that supports a DAS.

Referring to FIG. 3, the base station performs a grouping operation of a plurality of antennas into a predetermined number of local antenna groups (S301). Each of the local antenna groups may be configured to include maximum 4Tx or 8Tx antennas to apply the existing communication standard thereto. In other words, the base station may allocate a separate pilot pattern to antennas which belong to one group.

The base station that has performed local antenna grouping broadcasts information on a mapping rule of each local antenna group of antennas to the user equipment that has entered the cell (S302).

Afterwards, the base station transmits downlink signal(s) such as CRS(s), CSI-RS(s) and midamble(s) to the user equipment (S303). At this time, the base station allocates a pilot pattern set in a unit of local antenna group, wherein the pilot pattern set may be configured in such a manner that each of a plurality of antennas belonging to one antenna group uses a separate pilot pattern. For example, a DAS base station that includes 24 downlink transmitting antennas may be configured in such a manner that one local antenna group includes 8 antennas to form a total of three antenna groups and 8Tx midamble is transmitted through each antenna group.

The user equipment that has received the downlink signal from the base station performs channel measurement per antenna in accordance with the allocated pilot pattern (S304). At this step, the user equipment may generate channel quality information and information on base station antenna, which may be detected by the corresponding user equipment, on the basis of receiving strength of a signal transmitted through each antenna.

Afterwards, the user equipment transmits the generated feedback information to the base station (S305).

If a plurality of base station antennas are grouped into local antenna groups and a pilot pattern set is allocated in a unit of group in accordance with one embodiment of the present invention, since the pilot pattern set may be reused in a unit of group, pilot overhead may be more reduced than the case where the separate pilot pattern per antenna is allocated.

At this time, as antennas that use the same pilot pattern between the groups exist, multiplexing schemes such as frequency division multiplexing (FDM), time division multiplexing (TDM), and code division multiplexing (CDM) may be used to reduce interference between the respective local antenna groups.

For example, a frequency full band used by the base station may be divided into N number of frequency subbands in accordance with the number (N) of generated local antenna groups, wherein the first local antenna group may be allocated to use the first frequency subband and the second local antenna group may be allocated to use the second frequency subband. Accordingly, the n-th antennas of the espective local antenna groups, which use the same pilot pattern, may reduce interference between pilot signals even though the same pilot pattern is used.

For another example, when the midamble is transmitted using the TDM scheme, the midamble transmitted from the first subframe may be allocated to the first local antenna group, and the midamble transmitted from the second subframe may be allocated to the second local antenna group.

As described above, the local antenna groups according to one embodiment of the present invention may include the same antenna as well as different antennas.

2. Second Embodiment

Service Support for Legacy User Equipment and DAS Support User Equipment

If a DAS according to one embodiment of the present invention provides a service to both an existing CAS based user equipment and a user equipment which supports a DAS, the user equipments need to identify the CAS from the DAS.

Accordingly, another embodiment of the present invention suggests a method for differentiating pilot signals for user equipments that support the existing CAS from pilot signals for user equipments that support the DAS.

The pilot signal includes a cell-specific reference signal (CRS), a channel state information-reference signal (CSI-RS), and midamble. The midamble is a synchronization pattern inserted between data symbols to improve channel estimation performance, and is used to reinforce a channel estimation function when each antenna transmits a symbol during communication. The midamble may be inserted into data symbols transmitted through a downlink subframe periodically or non-periodically.

In the DAS according to one embodiment of the present invention, the pilot signal for the DAS support user equipments may be configured separately from the pilot signal for the existing CAS support user equipments. The pilot signal for the DAS support user equipments may be referred to as a global midamble or global CSI-RS. Hereinafter, in the embodiment of the present invention, the global midamble will exemplarily be described as the pilot signal for the DAS support user equipment.

Hereinafter, for convenience of description, the CAS based system of the current 3GPP LTE/LTE-A and IEEE 802.16 system will be referred to as a legacy system, and the CAS support user equipment will be referred to as a legacy user equipment.

Figure 4:
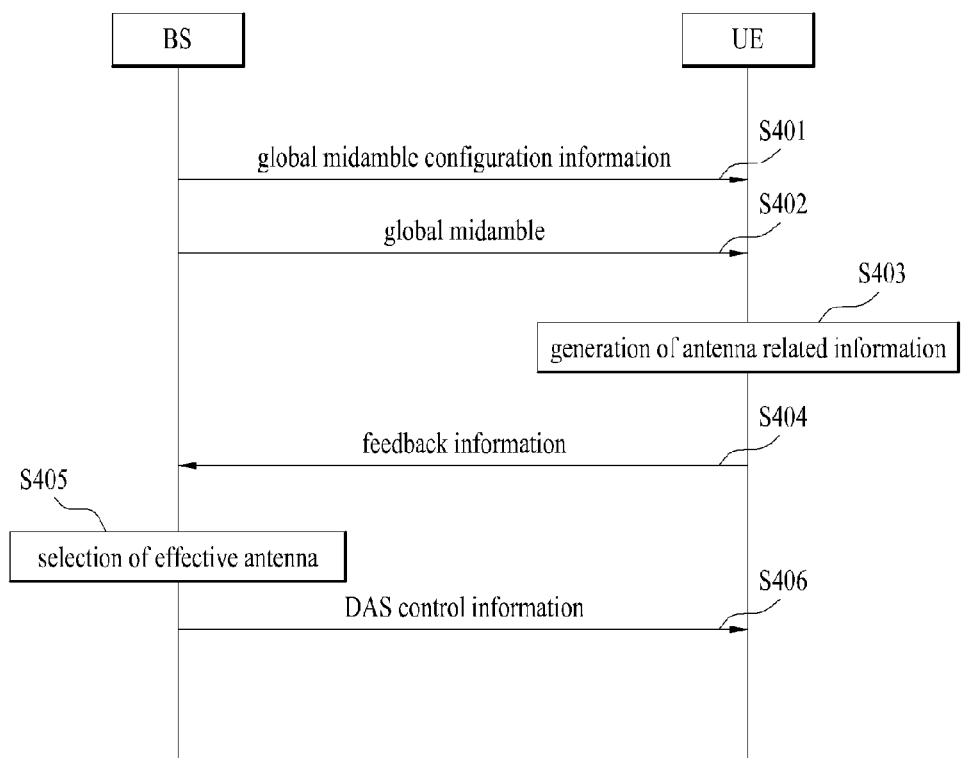
FIG. 4 is a diagram illustrating another example of a procedure of signal transmission between a base station and a user equipment in a DAS according to one embodiment of the present invention.

FIG. 4 is a diagram illustrating another example of a procedure of signal transmission between a base station and a user equipment in a DAS according to one embodiment of the present invention. The user equipment shown in FIG. 4 may be a user equipment or a user equipment group that supports a DAS.

Referring to FIG. 4, the base station broadcasts broadcast information, which includes configuration information on the global midamble, to all the user equipments or user equipment groups, which have entered a DAS cell (S401). The broadcast information may further include information indicating that the corresponding cell is a DAS cell supporting the DAS, and configuration information on the DAS.

The base station broadcasts the global midamble to all the user equipments or user equipment groups within the cell (S402). The global midamble is allocated to each DAS base station antenna, and is transmitted through different resources, whereby the user equipment that has received the global midamble may differentiate each antenna and obtain antenna index information through the transmission order of the global midamble or the location of the global midamble on the symbol.

The user equipment or user equipment group may perform channel estimation by using the received global midamble and generate information on one or more effective antennas, which may be detected by the corresponding user equipment or user equipment group, from among a total of antennas of the base station, on the basis of receiving strength (S403).

The user equipment or user equipment group transmits feedback information, which includes the information on the effective antenna(s), to the base station (S404). The information on the effective antenna(s) may include receiving strength per antenna, and information on antenna(s) preferred by the corresponding user equipment or user equipment group in accordance or a predetermined reference on the basis of receiving strength per antenna.

The base station, which has received the feedback information, may determine an effective antenna or antenna group, which is intended to be used for communication with the corresponding user equipment or user equipment group, by referring to the result based on measurement of an uplink signal transmitted from the user equipment, on the basis of the feedback information (S405).

And, the base station may transmit DAS control information, which includes information on the determined effective antenna or antenna group, to the user equipment or user equipment group (S406). At this time, the information on the effective antenna or antenna group may include the number of antennas and/or index information. In this case, the number of antennas may be used as the number of physical antennas, logical antennas or antenna ports.

Afterwards, the user equipment or user equipment group, which has acquired the information on the effective antenna(s), may acquire channel information of antenna(s) effective to the corresponding user equipment or user equipment group from the global midamble transmitted in accordance with a predetermined period to perform a closed loop MIMO (CL-MEMO) operation.

For example, if the DAS base station includes 24 distributed antenna, the global midamble supporting each antenna is configured by 24 types. In this case, if the effective antennas for the first user equipment are Ant 2 and Ant 3, the channel information on the effective antennas may be acquired using the global midamble corresponding to the pilot pattern of each antenna.

The global midamble according to one embodiment of the present invention is configured for all the antennas of the base station. The user equipment or user equipment group, which has received the global midamble, may perform channel estimation for each antenna and acquire channel information on the effective antenna(s) for each user equipment or equipment group.

In the meantime, in the embodiment of FIG. 4, the base station may configure the midamble and pilot signal such as CSI-RS, which may be used when channel information is acquired by the legacy user equipment located in the cell, per CAS antenna, and may broadcast the midamble and pilot signal simultaneously with the aforementioned global midamble or in accordance with a separate transmission period.

Figure 5:
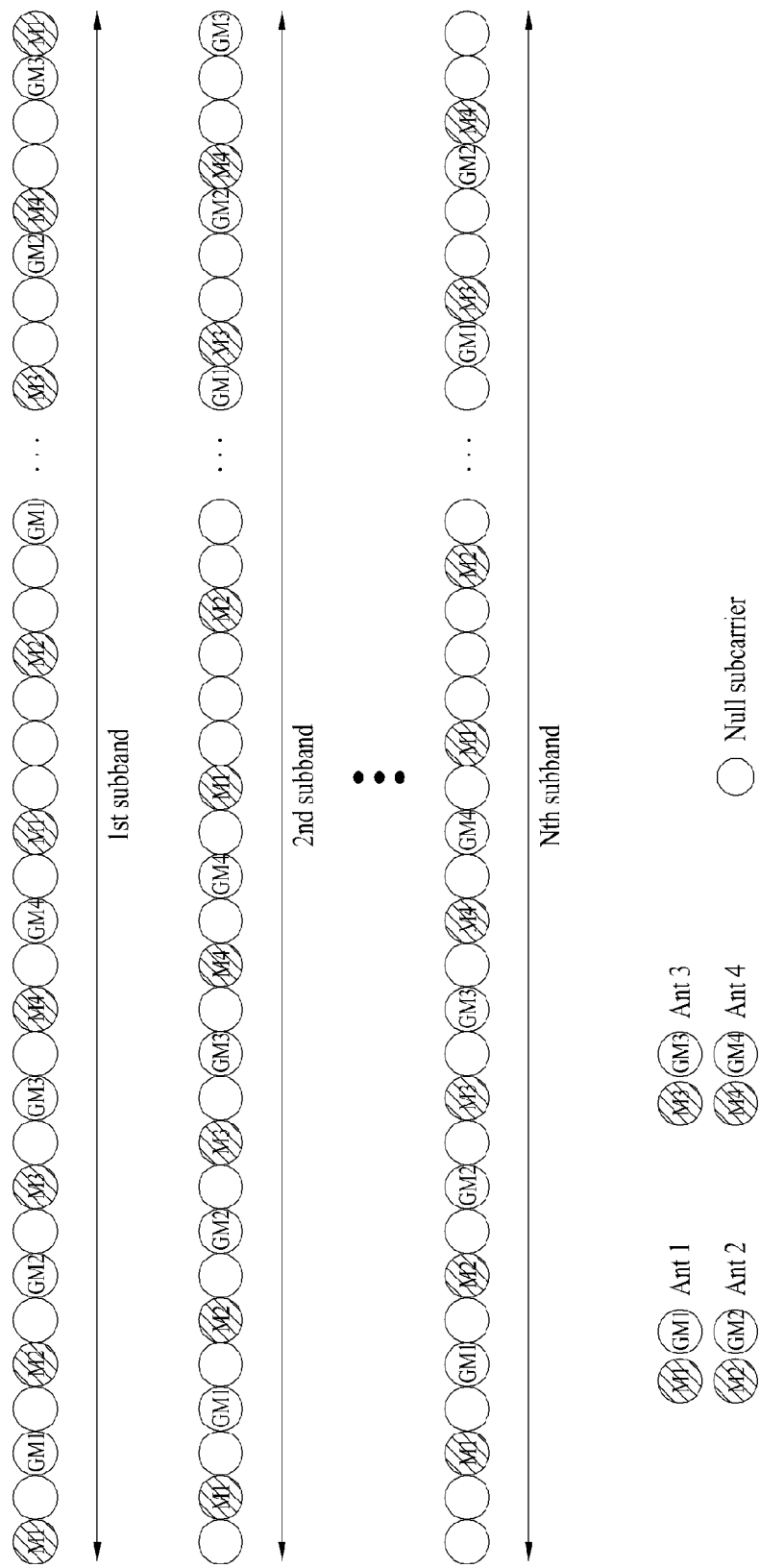
FIG. 5 is a diagram illustrating an example of a structure of a frame, which includes a pilot signal broadcasted from a base station in a DAS according to one embodiment of the present invention.

FIG. 5 is a diagram illustrating an example of a structure of a frame, which includes a pilot signal broadcasted from a base station in a DAS according to one embodiment of the present invention. The DAS having a total of eight transmitting antennas will be described exemplarily, wherein the eight transmitting antennas are configured by four central antennas (CA) at a central antenna node and four distributed antennas (DA) spaced apart from one another at predetermined intervals. In this case, the legacy user equipment may recognize the corresponding system as the CAS that includes four antennas, and the DAS user equipment may recognize the corresponding system as the DAS that includes a total of eight antennas.

The base station may configure the existing midamble and global midamble for each antenna while configuring midamble to support the legacy user equipment and the DAS user equipment.

In FIG. 5, Mx represents a midamble for the x-th antenna, which is transmitted for the legacy user equipment, and GMx represents a global midamble for the x-th antenna, which is transmitted for the DAS user equipment. At locations of M1, M2, M3 and M4, the midamble is transmitted from each of the four CAs, and the midamble is transmitted from each of the four DAs at locations of GM1, GM2, GM3 and GM4.

The legacy user equipment may recognize the system as the system having four transmitting antennas, and may receive the pilot signal at the locations of M1, M2, M3 and M4. On the other hand, since the DAS user equipment may read out the pilot signal even at the GMx as well as the Mx, it may receive a total of eight pilot signals.

Each of the midamble M and the global midamble GM for each antenna is transmitted in accordance with a predetermined transmission period, and the transmission period of the midamble may be the same as that of the global midamble or not.

As described above, if the base station includes global midambles as much as the number of distributed antennas located in a DAS cell, overhead of the global midamble is increased in proportional to the increase of the distributed antennas. To maintain overhead of the global midamble at a predetermined level, a transmission period of the global midamble may be set to be relatively longer. However, in this case, density of the pilot signals is lowered, whereby channel estimation performance may be deteriorated. As a result, performance such as CL-MIMO operation may be deteriorated.

In this respect, in accordance with the first embodiment of the present invention, a plurality of base station antennas may be configured by a local antenna group, which includes a predetermined number of antennas, whereby a predetermined number of pilot patterns may be allocated in a unit of antenna group.

In other words, instead of a global midamble separate for each of the distributed antennas, a global midamble for each of a plurality of antennas included in each of antenna groups may be configured. For example, if a total of 24 distributed antennas are provided, three local antenna groups, each of which includes 8 neighboring distributed antennas, are formed, whereby 8 independent global midambles are used for one group, and 8 global midambles are also used for another group. As a result, the global midambles, which uses 8 pilot patterns only, may be configured.

Alternatively, another embodiment of the present invention suggests a method for additionally configuring a midamble or CSI-RS per user equipment or user equipment group to minimize degradation of performance such as CL-MIMO operation.

The DAS according to one embodiment of the present invention may configure a midamble or CSI-RS through a pilot signal additionally provided per DAS user equipment or user equipment group. Hereinafter, in the embodiment of the present invention, the midamble specified per user equipment or user equipment group, which supports the DAS, will be referred to as a 'local midamble'.

The global midamble is transmitted to all the user equipments located in the DAS cell, whereas the local midamble is configured to be divided per specific user equipment or user equipment group. Accordingly, the local midamble has higher pilot density per antenna than that of the global midamble.

Figure 6:
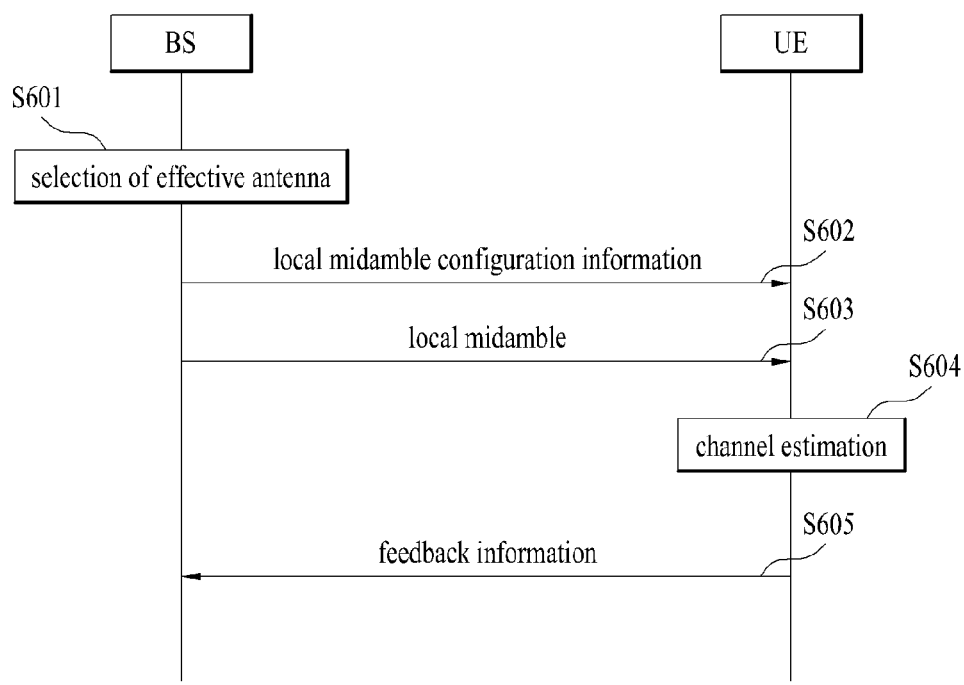
FIG. 6 is a diagram illustrating another example of a procedure of signal transmission between a base station and a user equipment in a DAS according to one embodiment of the present invention.

FIG. 6 is a diagram illustrating another example of a procedure of signal transmission between a base station and a user equipment in a DAS according to one embodiment of the present invention. The user equipment shown in FIG. 6 may be a user equipment or a user equipment group that supports a DAS.

Referring to FIG. 6, the base station selects effective antenna(s) per user equipment or user equipment group located in a DAS cell (S601). At this time, the effective antenna(s) may be selected on the basis of feedback information if the feedback information related to the effective antenna(s) is generated by the user equipment and transmitted through the global midamble in accordance with the embodiment of the present invention. Alternatively, the effective antenna(s) may be selected optionally by the base station through measurement of an uplink signal transmitted from each user equipment.

The base station transmits configuration information on the local midamble configured per user equipment or user equipment group located in the DAS cell, to the corresponding user equipment or user equipment group (S602). The local midamble specified per user equipment or user equipment group may be regarded as the midamble specified for effective antenna(s) specified for the corresponding user equipment or user equipment group. In other words, in the DAS, as the base station specifies downlink transmitting antenna(s) effective per user equipment or user equipment group, it may transmit the local midamble specified per user equipment or user equipment group.

At this time, in order to reduce interference that may occur due to the local midamble for another user equipment or user equipment group, configuration information on the local midamble may further include local midamble information for another user equipment or user equipment group. Since the user equipment reads its local midamble on the basis of the local midamble configuration information but may not read the local midamble corresponding to other user equipment, it may transmit various types of local midambles at the same resource domain.

For example, if data of the first user equipment and data of the second user equipment are overlaid using the same time and frequency resources of different antennas, the first user equipment may remove interference during data reception on the basis of the local midamble configuration information on the second user equipment.

Also, the configuration information on the local midamble may further include the number of effective antennas and/or effective antenna index information as the information on the effective antenna(s) specified per user equipment or user equipment group.

Afterwards, the base station transmits the local midamble based on the local midamble configuration information to each user equipment or user equipment group (S603).

The user equipment or user equipment group performs channel estimation on the basis of the local midamble (S604), and feeds the result of channel estimation back to the base station (S605).

According to the aforementioned embodiments of the present invention, the base station may configure the global midamble and the local midamble separately for the DAS support user equipment, and the existing CRS, CSI-RS and midamble may be used as the pilot signals for the legacy user equipment.

Figure 7:
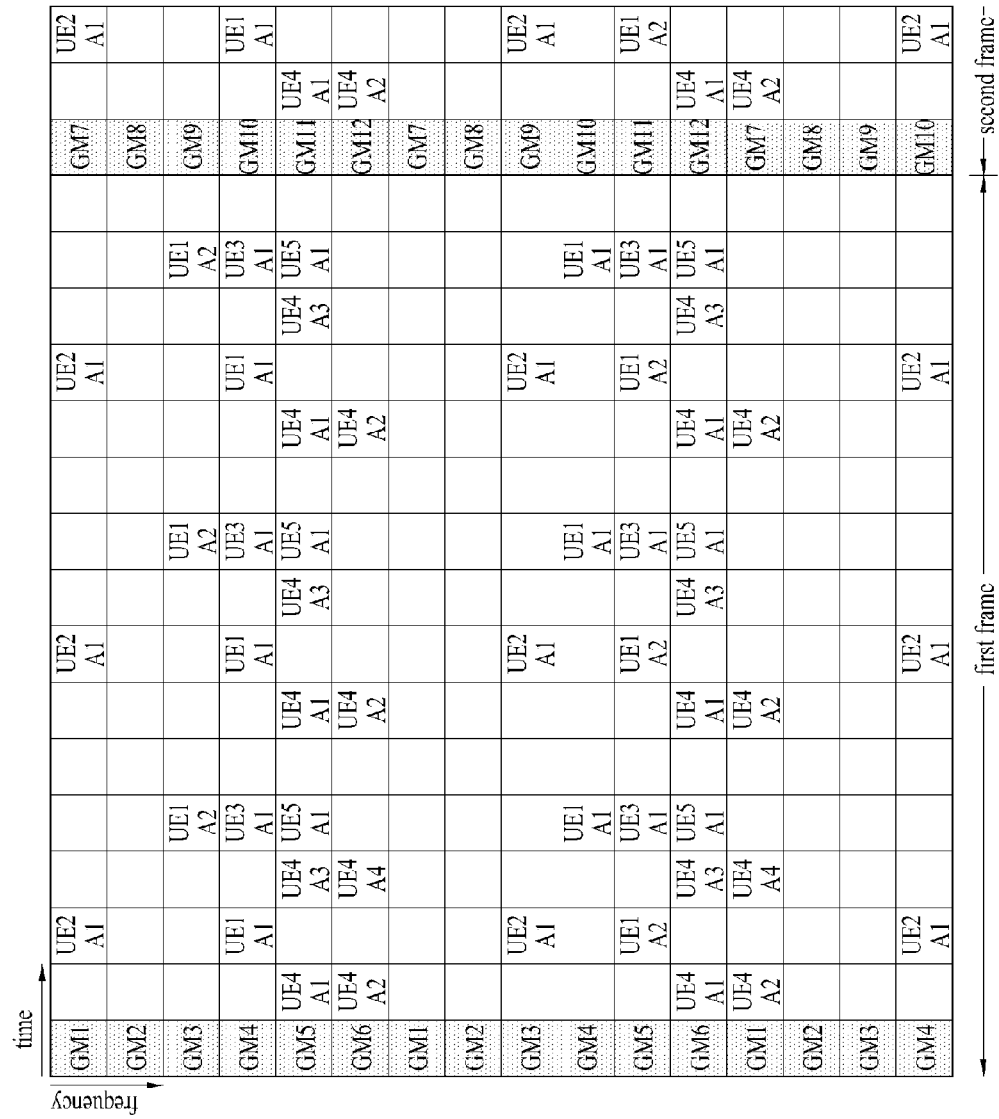
FIG. 7 is a diagram illustrating an example of a structure of radio resources, which include a pilot signal broadcasted from a base station in a DAS according to one embodiment of the present invention.

FIG. 7 is a diagram illustrating an example of a structure of radio resources, which include a pilot signal broadcasted from a base station in a DAS according to one embodiment of the present invention.

In FIG. 7, the radio resources include a plurality of resource areas on a frequency axis and a time axis, and each block means a resource unit for transmission of the midamble. Examples of the resource unit may include a subframe, a resource unit having a predetermined number of subcarriers * a predetermined number of transmission symbols (for example, OFDM symbols), a resource block, a subband, and a resource element (RE) defined by one subcarrier * one transmission symbol.

In FIG. 7, the resource unit for transmission of each midamble may be defined as one OFDM symbol, and one subframe includes 8 OFDM symbols. At this time, it is assumed that a DAS base station includes 12 distributed antennas in the system that uses the corresponding radio resource.

The base station according to one embodiment of the present invention may configure 12 global midambles (GM) per distributed antenna and broadcast the configured global midambles in a cell zone in accordance with the aforementioned embodiment. At this time, in order that channel estimation performance of the user equipment per antenna is not deteriorated due to density of the pilot signal, which is reduced by the increase of the distributed antennas, the base station may broadcast global midambles (GM 1 to GM 6 and GM 7 to GM 12) corresponding to six antennas on the basis of two subframes. In other words, GM 1 to GM 6 are transmitted through first two subframes (first frames) on the time domain, and next GM 7 to GM 12 are transmitted through next continuous two subframes (second frames).

Also, the base station may configure a local midamble per user equipment or user equipment group and broadcast the local midamble within a transmission period of the global midamble.

Referring to FIG. 7, it is assumed that two effective transmitting antennas are allocated to the user equipment 1 (UE 1), one effective transmitting antenna is allocated to the user equipment 3 (UE 3) and the user equipment 5 (UE 5), and four effective transmitting antennas are allocated to the user equipment 4 (UE 4). Each of the user equipments may receive the local midamble corresponding to the number of associated effective antennas in a resource domain. For example, the user equipment 1 may receive information on the local midambles of two types corresponding to the two effective transmitting antennas and then read the local midamble corresponding to the user equipment 1 on the basis of the corresponding information.

Although FIG. 7 illustrates that the local midamble corresponding to each user equipment is transmitted in different frequency and time resource domains, if signal strength affected between the base station antennas is weak due to the physical distance of the base station antennas, the base station may transmit the local midambles for different user equipments or user equipment groups in the same resource domain of different antennas. In this case, overhead caused by the local midambles may be reduced. For example, the local midamble of the user equipment 3 may also be transmitted in the RE where the local midamble of the user equipment 2 is transmitted.

As described above, according to the aforementioned embodiments, the base station may configure the existing midamble and global midamble or local midamble in accordance with antennas located in the cell. For example, a cell of a hybrid system of the CAS and the DAS, in which 8Tx CAS are located at the cell center and 6Tx DAs are additionally provided in the region other than the center, is operated as 14 Tx DAS cell. The base station may allocate the existing pilot signal to 8 CAS antennas located at the cell center to support the legacy user equipment. And, global midambles and/or local midamble for a total of 14 antennas located in the cell may separately be configured for the DAS support user equipments. In this case, the legacy user equipment and the DAS support user equipment may respectively perform channel estimation per antenna through their pilot signal.

Unlike the above, in order to minimize increase of pilot overhead in the hybrid system of the CAS and the DAS in accordance with one embodiment of the present invention, some of the pilot signal for the legacy user equipment may be reused as the global midamble or the local midamble.

For example, in the system environment, in which 14Tx DAS cell is operated using CAS based 8Tx antennas and DAS based 6Tx antennas, the base station according to one embodiment of the present invention allocates 8Tx pilots for the legacy user equipment to 8 CAS antennas. And, the base station may allocate the global midamble to the other 6 DAS antennas and additionally allocate the local midamble. In other words, instead of the global midamble for a total of 14 antennas, the global midamble may be configured for 6 additional antennas while the existing 8 pilot signals are reused.

In this case, the DAS support user equipments may perform channel estimation for 8 antennas at the cell center based on 8 pilot patterns for the existing legacy user equipments, and may perform channel estimation for added distributed antennas based on newly added 6 global midamble patterns. Meanwhile, the legacy user equipments may recognize the corresponding cell as a 8Tx CAS cell, and may perform channel estimation per antenna based on 8Tx pilots for the existing legacy user equipments.

The user equipment and the base station belonging to the DAS, through which the aforementioned embodiments of the present invention can be carried out, will be described with reference to FIG. 8.

Figure 8:
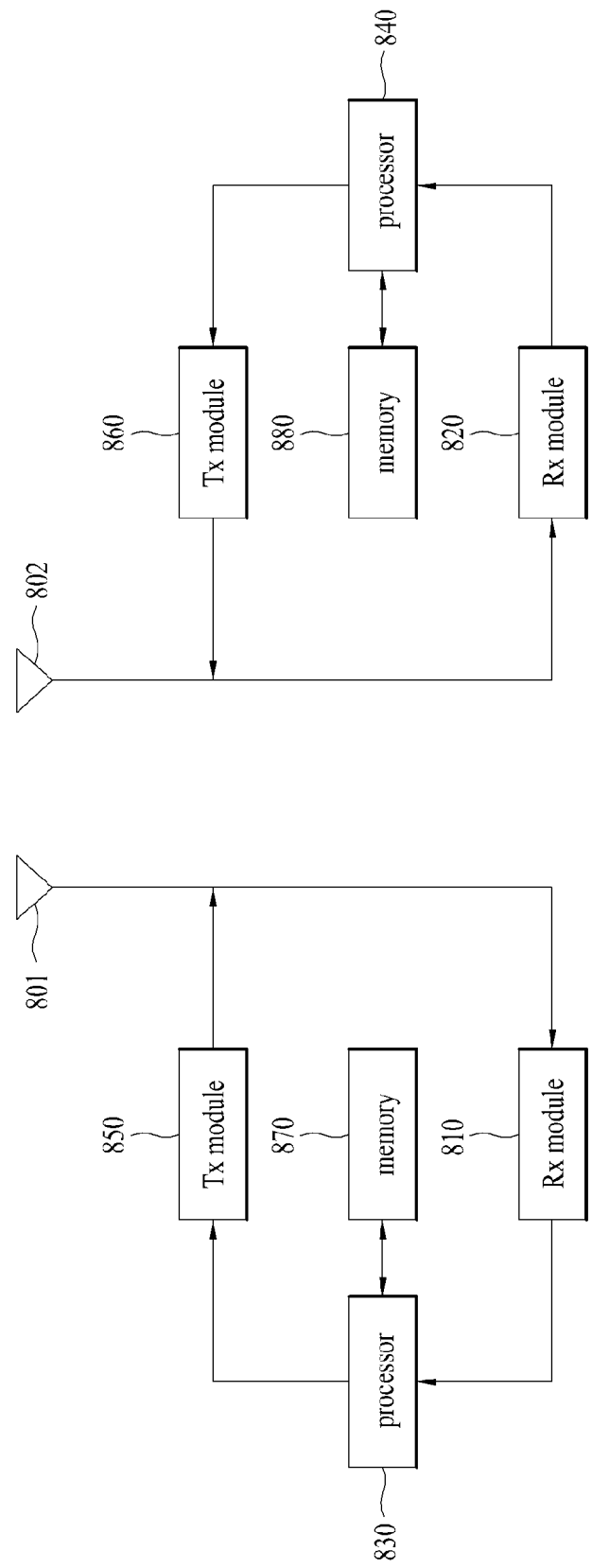
FIG. 8 is a block diagram illustrating a base station and a user equipment through which the embodiments of the present invention can be carried out.

FIG. 8 is a block diagram illustrating a base station and a user equipment, through which the embodiments of the present invention can be carried out.

The user equipment may be operated as a transmission apparatus on an uplink and as a reception apparatus on a downlink. Also, the base station may be operated as a reception apparatus on the uplink and as a transmission apparatus on the downlink. In other words, each of the user equipment and the base station may include a transmission apparatus and a reception apparatus for transmission of information or data.

The base station and the user equipment may include a processor, modules, parts, and/or means for implementing the embodiments of the present invention. Especially, the base station and the user equipment may include a module (means) for encrypting messages, a module for interpreting encrypted messages, an antenna for transmitting and receiving messages, etc.

Referring to FIG. 8, the left part represents a structure of the transmission apparatus, i.e., the base station belonging to the DAS, and the right part represents a structure of the reception apparatus, i.e., the user equipment that enters a cell supported by the DAS base station. Each of the transmission apparatus and the reception apparatus may include an antenna module 801 or 802, a Reception (Rx) module 810 or 820, a processor 830 or 840, a Transmission (Tx) module 850 or 860, and a memory 870 or 880.

The antenna module 801 or 802 includes a receiving antenna externally receiving radio frequency (RF) signals and transferring the RF signals to the Rx module 810 or 820 and a transmitting antenna transmitting the signals generated from the Tx module 850 or 860 to the outside. If a Multiple Input Multiple Output (MIMO) function is supported, two or more antennas may be provided.

The antenna module 801 of the transmission apparatus shown in FIG. 8 represents one or more distributed antennas (DAs) selected from the entire antennas of the base station on the basis of the channel status during communication, the location of the user equipment, and the distance between the base station and the user equipment. The selected one or more DAs may not be fixed but be changed depending on location change of the reception apparatus.

The Rx module 810 or 820 may perform decoding and demodulation for the RF signals externally received through the antenna to recover original data and then transfer the recovered data to the processor 830 or 840. The Rx module and the antenna may be incorporated into a receiving unit for receiving the RF signal unlike FIG. 8.

The processor 830 or 840 generally controls the overall operation of the transmission apparatus or the reception apparatus. In particular, the processor 830 or 840 may perform a controller function for implementing the aforementioned embodiments of the present invention, a variable Medium Access Control (MAC) frame control function based on service characteristics and a propagation environment, a handover (HO) function, an authentication and encryption function, etc.

The Tx module 850 or 860 may perform predetermined coding and modulation for data, which are scheduled from the processor 830, 840 and then transmitted to the outside, and then may transfer the coded and modulated data to the antenna. The Tx module and the antenna may be incorporated into a transmitting unit for transmitting the radio signal unlike FIG. 8.

The memory 870 or 880 may store a program for processing and control of the processor 830 or 840, or may perform a function for temporarily storing input/output data (uplink (UL) grant allocated from the base station in case of the user equipment), system information, base station identifier (STID), flow identifier (FID), and action time.

Also, the memory 870 or 880 may include at least one type of storage media such as a flash memory, a hard disk, a multimedia card micro, a card-type memory (e.g. a Secure Digital (SD) or eXtreme Digital (XD) memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disc, an optical disc, etc.

The processor 830 of the transmission apparatus performs the whole control operation for the base station, and may configure the antennas of the base station according to one embodiment of the present invention as described in FIG. 3 into a plurality of local antenna groups and allocate pilot pattern sets in a unit of group. Also, the processor 830 may configure global midambles and local midambles for the DAS support user equipments according to another embodiment of the present invention as described in FIG. 4 to FIG. 7 as well as general midamble that may be performed for channel estimation per antenna by general legacy user equipments.

Also, the processor 830 may generate at least one of local antenna group mapping information, global midamble configuration information and local midamble configuration information according to the embodiments of the present invention and transmit the generated information to the reception apparatus.

Also, the processor 830 of the transmission apparatus may include configuration information on the DAS and control information, which includes the number of antennas and/or antenna index information, as information on effective antenna or antenna group to be used for communication with each user equipment.

The reception apparatus may acquire various kinds of configuration information on the DAS and information on antennas or antenna group to be used for communication with the transmission apparatus by receiving the signal and the DAS control information from the transmission apparatus through the Rx module 820.

The processor 840 of the reception apparatus performs the whole control operation for the user equipment, and may perform channel estimation per antenna by measuring downlink signals transmitted from the transmission apparatus. Also, the processor 840 may include information on base station antenna based on receiving strength per antenna and feedback information based on channel estimation.

Meanwhile, the base station may perform a control function for performing the aforementioned embodiments of the present invention, an orthogonal frequency division multiple access (OFDMA) packet scheduling, time division duplex (TDD) packet scheduling and channel multiplexing function, a medium access control (MAC) frame variable control function based on service characteristics and radio wave condition, a quick traffic real-time control function, a handover function, an authentication and encryption function, a packet modulation and demodulation function for data transmission, a quick packet channel coding function and a real-time modem control function through at least one of the aforementioned modules, or may further include a separate means, module, or part for performing the aforementioned functions.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The embodiments of the present invention may be used for the base station or the user equipment, or other equipments in the wireless communication system.

The invention claimed is:

1. A method for receiving, by a user equipment, a reference signal, the method comprising:
   receiving first configuration information indicating a configuration of a first channel state information reference signal (CSI-RS) being broadcast;
   receiving the first CSI-RS based on the configuration of the first CSI-RS; and
   performing channel measurement based on the first CSI-RS,
   wherein the configuration of the first CSI-RS is dedicated to the user equipment.

2. The method according to claim 1, wherein the first configuration information includes a number of antennas associated with the first CSI-RS.

3. The method according to claim 2, wherein the first CSI-RS is associated with a group of antennas that includes one or more antennas.

4. The method according to claim 3, wherein the first CSI-RS is received using a pilot pattern allocated to the group of antennas.

5. The method according to claim 1, further comprising:
   receiving second configuration information indicating a configuration of a second CSI-RS, that is associated with channel interference.

6. A method for transmitting, by a base station, a reference signal, the method comprising:
   transmitting first configuration information indicating a configuration of a first channel state information reference signal (CSI-RS);
   broadcasting the first CSI-RS to a user equipment based on the configuration of the first CSI-RS; and
   receiving feedback information according to channel measurement based on the first CSI-RS,
   wherein the configuration of the first CSI-RS is dedicated to the user equipment.

7. The method according to claim 6, wherein the first configuration information includes a number of antennas associated with the first CSI-RS.

8. The method according to claim 7, wherein the first CSI-RS is associated with a group of antennas that includes one or more antennas.

9. The method according to claim 8, wherein the first CSI-RS is transmitted using a pilot pattern allocated to the group of antennas.

10. The method according to claim 6, further comprising:
    transmitting second configuration information indicating a configuration of a second CSI-RS, that is associated with channel interference.

11. A user equipment comprising:
    a reception module configured to receive first configuration information indicating a configuration of a first channel state information reference signal (CSI-RS) being broadcast; and
    a processor configured to control the reception module,
    wherein the reception module is further configured to receive the first CSI-RS based on the configuration of the first CSI-RS, and to perform channel measurement based on the first CSI-RS, and
    wherein the configuration of the first CSI-RS is dedicated to the user equipment.

12. The user equipment according to claim 11, wherein the first configuration information includes a number of antennas associated with the first CSI-RS.

13. The user equipment according to claim 12, wherein the first CSI-RS is associated with a group of antennas that includes one or more antennas.

14. The user equipment according to claim 13, wherein the processor is configured to control the reception module to receive the first CSI-RS based on a pilot pattern allocated to the group of antennas.

15. The user equipment according to claim 11, wherein the reception module further receives second configuration information indicating a configuration of a second CSI-RS, that is associated with channel interference.

16. A base station comprising:
    a transmission module; and
    a processor configured to control the transmission module,
    wherein the transmission module is configured to transmit first configuration information indicating a configuration of a first channel state information reference signal (CSI-RS) being broadcast, and to broadcast the first CSI-RS based on the configuration of the first CSI-RS to a user equipment, and
    wherein the configuration of the first CSI-RS is dedicated to the user equipment.

17. The base station according to claim 16, wherein the first configuration information includes a number of antennas associated with the first CSI-RS.

18. The base station according to claim 17, wherein the first CSI-RS is associated with a group of antennas that includes one or more antennas.

19. The base station according to claim 18, wherein the processor is further configured to control the transmission module to transmit the first CSI-RS based on a pilot pattern allocated to the group of antennas.

20. The base station according to claim 16, wherein the processor is further configured to control the transmission module to transmit second configuration information indicating a configuration of a second CSI-RS, that is associated with channel interference.

* * * * *